US010885594B2

(12) United States Patent
Xiao et al.

(10) Patent No.: US 10,885,594 B2
(45) Date of Patent: Jan. 5, 2021

(54) METHOD AND APPARATUS FOR ESTABLISHING ASSOCIATION RELATIONSHIP (71) Applicant: Tencent Technology (Shenzhen) Company Limited, Shenzhen (CN)

(72) Inventors: Canyong Xiao, Shenzhen (CN); Yanghui Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 331 days.

(21) Appl. No.: 15/993,340

(22) Filed: May 30, 2018

(65) Prior Publication Data

US 2018/0276677 A1  Sep. 27, 2018

Related U.S. Application Data (63) Continuation-in-part of application No. PCT/CN2017/072319, filed on Jan. 24, 2017.

(30) Foreign Application Priority Data

Feb. 5, 2016  (CN) .......................... 2016 1 0081984

(51) Int. Cl.
*G06Q 50/00* (2012.01)
*G06F 16/9535* (2019.01)
(Continued)

(52) U.S. Cl.
CPC ......... *G06Q 50/01* (2013.01); *G06F 16/9535* (2019.01); *G06Q 30/01* (2013.01);
(Continued)

(58) Field of Classification Search
None
See application file for complete search history.

(56) References Cited

U.S. PATENT DOCUMENTS 8,874,477 B2 * 10/2014 Hoffberg .............. G06Q 10/103
705/37
9,626,725 B2 * 4/2017 Rubinstein .............. H04L 51/12
(Continued)

FOREIGN PATENT DOCUMENTS

CN     101105848 A     1/2008
CN     103390243 A     11/2013
(Continued)

OTHER PUBLICATIONS

Tencent Technology, ISRWO, PCT/CN2017/072319, dated Apr. 17, 2017, 8 pgs.
(Continued)

*Primary Examiner* — Gurkanwaljit Singh
(74) *Attorney, Agent, or Firm* — Morgan, Lewis & Bockius LLP (57) ABSTRACT This application provides a method performed at a computer server for establishing an association relationship. The computer server queries a first interaction record that corresponds to a public service identifier and a social application identifier of a social platform, and that indicates an interaction performed, by using the public service identifier and the social application identifier, by a first user and a second user; determining whether the first interaction record meets a first preset condition; and establishing an association relationship between the social application identifier and the public service identifier if the first interaction record meets the first preset condition. In this way, an association relationship between a consumer user and a merchant user is automatically established according to offline consumption records of the consumer user.

20 Claims, 5 Drawing Sheets (51) Int. Cl.
*H04L 12/58* (2006.01)
*H04L 29/08* (2006.01)
*G06Q 30/00* (2012.01)
*G06Q 30/02* (2012.01)

(52) U.S. Cl.
CPC ......... *G06Q 30/0201* (2013.01); *H04L 51/32* (2013.01); *H04L 67/10* (2013.01); *H04L 67/22* (2013.01)

(56) References Cited

U.S. PATENT DOCUMENTS

| | | | | |
|---|---|---|---|---|
| 9,646,096 | B2* | 5/2017 | Tsai | H04L 67/22 |
| 9,693,186 | B1* | 6/2017 | Anima | H04W 8/18 |
| 9,836,517 | B2* | 12/2017 | Presta | G06F 16/278 |
| 10,109,061 | B2* | 10/2018 | Bose | A63F 13/212 |
| 10,149,136 | B1* | 12/2018 | Sathya | H04W 4/80 |
| 10,165,065 | B1* | 12/2018 | Anantharaju | H04L 63/04 |
| 10,262,039 | B1* | 4/2019 | Ramanathan | G06F 16/9536 |
| 10,755,281 | B1* | 8/2020 | Yip | G06Q 20/4016 |
| 2006/0167784 | A1* | 7/2006 | Hoffberg | G06Q 20/401 705/37 |
| 2009/0254843 | A1* | 10/2009 | Van Wie | G06F 3/04815 715/757 |
| 2010/0229223 | A1* | 9/2010 | Shepard | H04L 67/02 726/5 |
| 2010/0317420 | A1* | 12/2010 | Hoffberg | G07F 17/323 463/1 |
| 2012/0151046 | A1* | 6/2012 | Weiss | G06F 11/3438 709/224 |
| 2012/0151047 | A1* | 6/2012 | Hodges | G06Q 50/01 709/224 |
| 2012/0166553 | A1* | 6/2012 | Rubinstein | G06Q 50/01 709/206 |
| 2012/0254184 | A1* | 10/2012 | Choudhary | G06Q 50/01 707/738 |
| 2013/0091213 | A1* | 4/2013 | Diab | H04L 67/306 709/204 |
| 2013/0218869 | A1* | 8/2013 | McConnell | G06F 16/284 707/722 |
| 2015/0269616 | A1 | 9/2015 | Flood et al. | |
| 2015/0347432 | A1* | 12/2015 | Tsai | G06F 16/958 715/202 |
| 2015/0347593 | A1* | 12/2015 | Tsai | G06O 50/01 707/722 |
| 2015/0370798 | A1* | 12/2015 | Ju | G06F 16/24578 707/748 |

FOREIGN PATENT DOCUMENTS

| | | |
|---|---|---|
| CN | 104408647 A | 3/2015 |
| CN | 104967552 A | 10/2015 |
| CN | 105654321 A | 6/2016 |

OTHER PUBLICATIONS

Tencent Technology, IPRP, PCT/CN2017/072319, dated Aug. 7, 2018, 6 pgs.

\* cited by examiner

METHOD AND APPARATUS FOR ESTABLISHING ASSOCIATION RELATIONSHIP

PRIORITY CLAIM AND RELATED APPLICATION

This application is a continuation-in-part of PCT/CN2017/072319, entitled "METHOD AND APPARATUS FOR ESTABLISHING ASSOCIATION RELATIONSHIP" filed on Jan. 24, 2017, which claims priority to Chinese Patent Application No. 201610081984.X, filed with the State Intellectual Property Office of the People's Republic of China on Feb. 5, 2016, and entitled "METHOD AND APPARATUS FOR ESTABLISHING ASSOCIATION RELATIONSHIP", all of which are incorporated herein by reference in their entirety.

FIELD OF THE TECHNOLOGY

This application relates to the field of computer technologies, especially, to a data processing method and apparatus, and in particular, to a method and an apparatus for establishing an association relationship.

BACKGROUND OF THE DISCLOSURE

With the constant development of computer networks and mobile terminal technologies, a growing number of merchant users manage members by using virtual membership cards.

To manage members by using virtual membership cards, a merchant user needs to promote offline to a user. If the user wants to be a member of the merchant user after learning of promotion information, the user may download a particular application program, and registers in the application program to become a member of the merchant user. Subsequently, when the user consumes at the merchant user, the user may show a membership certificate by using the application program, so as to obtain a discount from the merchant user.

In a process of implementing the present disclosure, the applicant finds that the foregoing technology has the following problem:

A virtual member relationship needs to be promoted offline by a merchant user, and also needs a user to perform member registration after learning of promotion information of the merchant user and deciding to be a member of the merchant user. Promotion and registration processes are relatively complex, wasting time of the merchant user and the user.

SUMMARY

To resolve the problem that promotion and registration processes of a virtual member relationship are relatively complex, and waste time of a merchant user and a user, embodiments of the present application provide a data processing method and apparatus, specifically a method and an apparatus for establishing an association relationship. The technical solutions are as follows.

According to a first aspect, a method for establishing an association relationship is performed at a computer server having one or more processors and memory storing instructions to be executed by the one or more processors, the method including:

querying a first interaction record corresponding to a public service identifier and a social application identifier of a social platform, the first interaction record being used for indicating an interaction performed, by using the public service identifier and the social application identifier, by a first user and a second user;

determining whether the first interaction record meets a first preset condition; and     establishing an association relationship between the social application identifier and the public service identifier in accordance with a determination that the first interaction record meets the first preset condition.

According to another aspect, a computer server includes one or more processors, memory, and a plurality of instructions stored in the memory that, when executed by the one or more processors, cause the computer server to perform the aforementioned method.

According to a third aspect of the present disclosure, a non-transitory computer readable storage medium storing a plurality of instructions configured for execution by a computer server having one or more processors, the plurality of instructions causing the computer server to perform the aforementioned method.

The technical solutions provided in the embodiments of the present application may include the following beneficial effects:

By means of querying the first interaction record that corresponds to the public service identifier and the social application identifier, and that is used for indicating the interaction performed, by using the public service identifier and the social application identifier, by the first user and the second user, establishing the association relationship between the social application identifier and the public service identifier when it is determined that the first interaction record meets the first preset condition, automatically collecting statistics on offline consumption records of a consumer user at a merchant user, and automatically establishing an association relationship between the consumer user and the merchant user according to the offline consumption records of the consumer user, the consumer user only needs to reserve an account during offline consumption, and the merchant user uploads the account and related consumption information to a server, so that the server can automatically detect and establish the association relationship. Neither initiative promotion of the merchant user nor initiative registration of the consumer user is needed, simplifying operation processes of the merchant user and the consumer user, and saving time for the merchant user and the consumer user.

It should be understood that the above general descriptions and the following detailed descriptions are merely for exemplary and explanatory purposes, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

Figure 1:
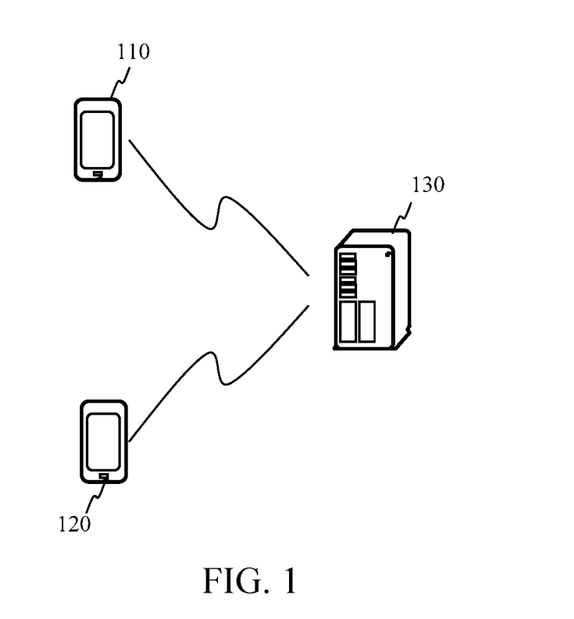
FIG. 1 is a schematic diagram of an implementation environment according to various embodiments of the present application.

FIG. 1 is a schematic diagram of an implementation environment according to various embodiments of the present application. As shown in FIG. 1, the implementation environment includes a first terminal 110, second terminal 120, and a server (for example, a social platform server) 130.

The first terminal 110 and the second terminal 120 may be smartphones, tablet computers, laptop portable computers, personal computers, and the like. The first terminal 110 is a terminal corresponding to a first user, and the second terminal 120 is a terminal corresponding to a second user.

The social platform server 130 may be an independent server, a server cluster formed by a plurality of servers that respectively implement different functions, or a cloud computing center.

As shown in FIG. 1, the first terminal 110 and the second terminal 120 are separately connected to the social platform server 130 by using a wired network or a wireless network. Social platform application programs (versions thereof may be the same or different) corresponding to the social platform server 130 are respectively installed in the first terminal 110 and the second terminal 120. The first user and the second user interact with each other via the social platform server 130 by using the social platform application programs installed in the respective terminals. Specifically, the first user pre-registers a public service identifier on the social platform server by using the first terminal 110, and the second user pre-registers a social application identifier on the social platform server by using the second terminal 120. The first user provides services for the second user corresponding to the social application identifier by using an interface (for example, a Web page) corresponding to the public service identifier. For example, the second user opens the social platform application program installed in the second terminal 120, and logs in to the social platform server 130 by using the social application identifier. The second user opens, in the social platform application program installed in the second terminal, the Web page corresponding to the public service identifier of the first user, so as to interact, in the Web page, information, bonus points, and the like with the first user.

Figure 2:
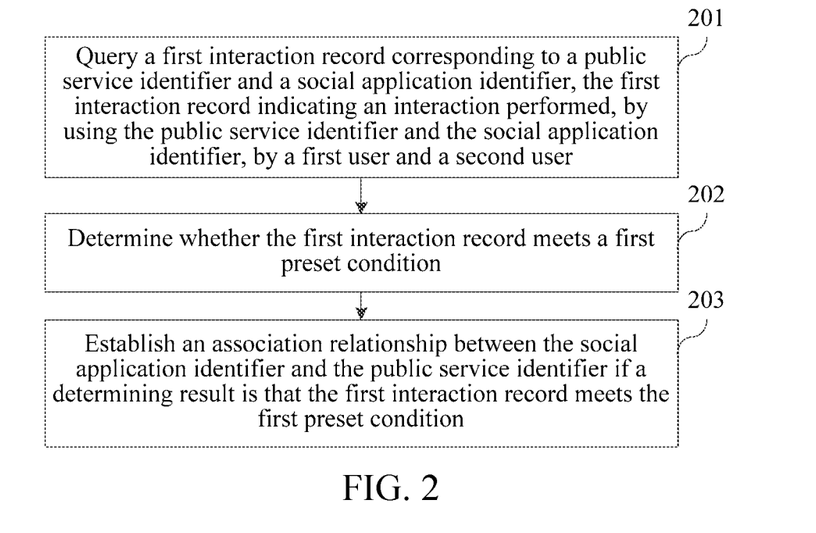
FIG. 2 is a flowchart of a method for establishing an association relationship according to an exemplary embodiment.

FIG. 2 is a flowchart of a method for establishing an association relationship according to an exemplary embodiment. The method may be performed by the social platform server 130 in the implementation environment shown in FIG. 1. As shown in FIG. 2, the method for establishing an association relationship may include the following steps:

Step 201: Query a first interaction record corresponding to a public service identifier and a social application identifier, the first interaction record being used for indicating an interaction, performed, by using the public service identifier and the social application identifier, by a first user and a second user.

Step 202: Determine whether the first interaction record meets a first preset condition.

Step 203: Establish an association relationship between the social application identifier and the public service identifier if a determining result is that the first interaction record meets the first preset condition.

The first interaction record may be stored in the social platform server, and the association relationship may be established in the social platform server.

The second user corresponds to the social application identifier, and the first user corresponds to the public service identifier.

The second user accesses an interface corresponding to the public service identifier by using the social application identifier, to interact with the first user. For example, the second user may interact with the first user by using a Web page corresponding to the public service identifier.

In some embodiments, the first interaction record is used for indicating an interaction performed, by using the Web page corresponding to the public service identifier, by the second user with the first user.

In a possible implementation scenario, the first user may be a merchant user, the second user may be a consumer user consuming at the merchant user, and the association relationship may be a member relationship between the consumer user and the merchant user. In view of the above, according to the method for establishing an association relationship provided in this embodiment of the present application, the social platform server queries the first interaction record that corresponds to the public service identifier and the social application identifier, and that is used for indicating the interaction performed, by using the public service identifier and the social application identifier, by the first user and the second user, and establishes the association relationship between the social application identifier and the public service identifier when determining that the first interaction record meets the first preset condition. According to the foregoing method, the association relationship between the consumer user and the merchant user can be automatically established according to offline consumption records of the consumer user, the consumer user only needs to reserve an account during offline consumption, and the merchant user uploads the account and related consumption information to the social platform server, so that the social platform server can automatically establish the association relationship. Neither initiative promotion of the merchant user nor initiative registration of the consumer user is needed, simplifying operation processes of the merchant user and the consumer user, and saving time for the merchant user and the consumer user.

In some embodiments, the social platform server 130 supports an instant messaging platform that allows users of the instant messaging platform to share messages with one another in the form of chat room. For example, the consumer user is a member of a group chat room and associated with the social application identifier, exchanging messages with other member of the chat room. Assuming that the consumer user receives a message at a mobile terminal, the message including a hyperlink to a webpage associated with the public service identifier. By clicking on the hyperlink, a web browser application is launched on the instant messaging platform through which the user can browse the webpage. When certain predefined conditions are met, the instant messaging platform sends an invitation message to the consumer user's user account. In response to the invitation message, the social platform server 130 can establish a subscription or membership relationship between the social application identifier and the public service identifier. The predefined conditions are used for checking interactions between the social application identifier and the public service identifier outside the instant messaging platform, e.g., using a mobile terminal associated with the public service identifier to scan an QR code displayed on the screen of a mobile terminal representing the social application identifier. After the subscription or membership relationship between the social application identifier and the public service identifier is established, all future interactions between the social application identifier and the public service identifier will be recorded in the social platform server 130 for tracking the user activities associated with the social application identifier.

Figure 3:
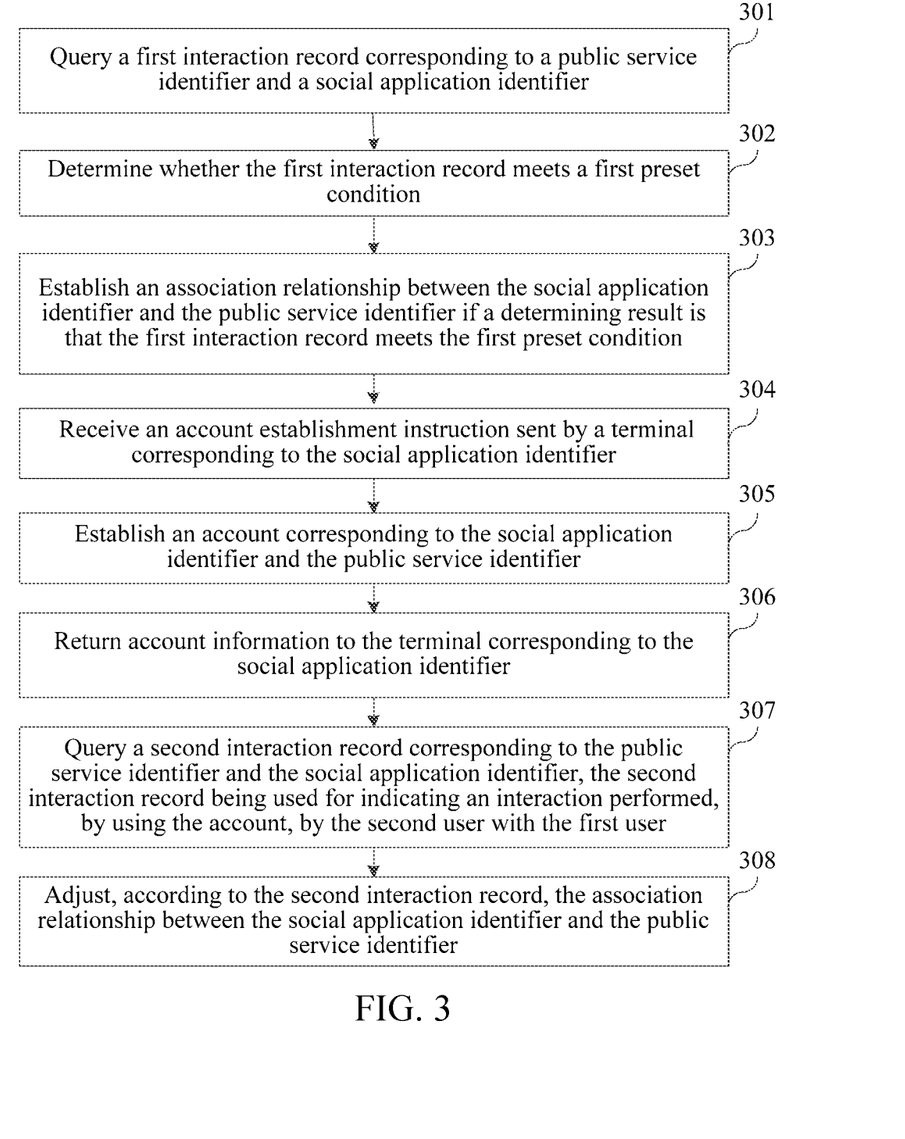
FIG. 3 is a flowchart of a method for establishing an association relationship according to another exemplary embodiment.

FIG. 3 is a flowchart of a method for establishing an association relationship according to another exemplary embodiment. The method may be performed by the social platform server 130 in the implementation environment shown in FIG. 1. As shown in FIG. 2, an association relationship is established between the social application identifier and the public service identifier and the association relationship is established in the social platform server as a member relationship between a consumer and a merchant, the first user is a merchant user corresponding to the first terminal, and the second user is a consumer user corresponding to the second terminal as an example, the method for establishing an association relationship may include the following steps:

Step 301: Query a first interaction record corresponding to a public service identifier and a social application identifier. The first interaction record may be stored in the social platform server.

In some embodiments, the first interaction record is used for indicating an interaction performed, by using the public service identifier and the social application identifier, by the first user and the second user.

In some embodiments, the first interaction record is used for indicating an interaction performed, by using a Web page corresponding to the public service identifier, by the second user with the first user.

Specifically, in a possible implementation, the first interaction record may be an offline consumption record of the consumer user at the merchant user. For example, during offline consumption at the merchant user, the consumer user may reserve a social application identifier of the consumer user, or may reserve a bound identifier bound to the social application identifier of the consumer user. For example, during offline consumption at the merchant user, the consumer user may display, by using the second terminal, a quick response code for payment. The merchant user scans the quick response code by using a scanning function in the first terminal to complete collection, obtains the social application identifier or the bound identifier, carried in the quick response code, of the consumer user, and uploads the social application identifier or the bound identifier, and an offline consumption record corresponding to the social application identifier or the bound identifier as the first interaction record to the social platform server for storage. Subsequently, the social platform server may query the first interaction record according to either or both of the public service identifier of the merchant user and the social application identifier of the consumer user.

The bound identifier may be a mobile phone number, a bonus point account (such as a bonus point card number, a deposit card number, or a credit card number), or another application platform identifier bound to the social application identifier. The consumer user may bind, in the social platform server, the social application identifier to a binding account such as a mobile phone number by using an application program installed in the terminal of the consumer user.

Step 302: Determine whether the first interaction record meets a first preset condition.

The first interaction record includes at least one of a bonus point interaction value, a quantity of times of interaction, an interaction type, or interaction time.

For example, using that the first interaction record is the offline consumption record of the consumer user at the merchant user as an example, the bonus point interaction value may be a consumption amount, the quantity of times of interaction is a quantity of times of consumption, the interaction type may be a type of a consumption object (a commodity or a service), and the interaction time is consumption time.

That the consumer user has an offline consumption record at the merchant user does not mean that the consumer user wants to be a member of the merchant user. To improve user experience, in this embodiment of the present application, whether the consumer user wants to be a member of the merchant user needs to be further determined in combination with the first interaction record. When it is determined that the first interaction record meets the first preset condition, it may be considered that the consumer user is willing to be a member of the merchant user to a large extent. The first preset condition includes at least one of the following conditions:

1) The bonus point interaction value is greater than a first value threshold.

For example, in this embodiment of the present application, when the social platform server determines that a total amount of the offline consumption of the consumer user at the merchant user exceeds an amount threshold, the social platform server may consider that the consumer user is very likely to be willing to be a member of the merchant user. Correspondingly, if the total amount of the offline consumption of the consumer user at the merchant user does not exceed an amount threshold, it is considered that the consumer user probably does not want to be a member of the merchant user.

2) The quantity of times of interaction is greater than a first threshold of the quantity of times.

For example, similar to the consumption amount, when the social platform server determines that a quantity of times of offline consumption of the consumer user at the merchant user exceeds a threshold of the quantity of times, the social platform server may consider that the consumer user is a regular customer of the merchant user, and is very likely to be willing to be a member of the merchant user. Correspondingly, if the quantity of times of offline consumption of the consumer user at the merchant user does not exceed a threshold of the quantity of times, it is considered that the consumer user probably consumes at the merchant user occasionally, and probably does not want to be a member of the merchant user.

3) The interaction type is a first specified type.

Using that the interaction type is the type of the consumption object as an example, the offline consumption of the consumer user at the merchant user probably is not voluntary consumption of the consumer user, for example, may be a payment for another person by the consumer user. In this case, the consumer user probably does not know the merchant user, and does not want to be a specified member of the merchant user, either. Alternatively, the consumer user may occasionally get a coupon of the merchant user. To avoid a waste of the coupon, the consumer user performs offline consumption at the merchant user by using the coupon. In this case, the consumer user probably does not want to be a member of the merchant user, either. In view of the above, when the social platform server determines that the consumption type of the offline consumption of the consumer user at the merchant user is voluntary consumption or consumption without using a coupon, the social platform server may consider that the consumer user is likely to be willing to be a member of the merchant user. Correspondingly, if offline consumptions of the consumer user at the merchant user are all payments for other persons or consumptions using coupons, it is considered that the consumer user probably does not want to be a member of the merchant user.

4) An interaction frequency in a preset time period is greater than a first interaction threshold.

Interest of the consumer user in the merchant user may be time limited. For example, in a latest time period, if the consumer user has a relatively high consumption frequency at the merchant user, it may be considered that the consumer user has a relatively high degree of interest in the merchant user in the latest time period, and is likely to be willing to be a member of the merchant user. On the contrary, if the consumer user frequently consumed at the merchant user long ago, but has a very low consumption frequency in the latest time period, or the consumption frequency of the consumer user at the merchant user is very low all the time, it may be considered that the consumer user is not interested in the merchant user, and it may be considered that the consumer user does not want to be a member of the merchant user.

This embodiment of the present application describes, merely by separately exemplifying the foregoing conditions, possible cases in which the consumer user wants to be a member of the merchant user. In actual application, to improve the accuracy, the foregoing conditions may be combined. For example, the social platform server may obtain a quantity of times of voluntary consumption or a total amount of the consumption of the consumer user at the merchant user in the last month. If the quantity of times of the voluntary consumption of the consumer user at the merchant user in the last month is greater than a threshold of the quantity of times, it is considered that the consumer user probably wants to be a member of the merchant user. Alternatively, if the total amount of the voluntary consumption of the consumer user at the merchant user in the last month is greater than an amount threshold, it is considered that the consumer user probably wants to be a member of the merchant user.

Step 303: Establish an association relationship between the social application identifier and the public service identifier if a determining result is that the first interaction record meets the first preset condition.

The consumer user may access, in an application program that is installed in the second terminal and that corresponds to the social platform server, an interface (for example, a Web page) corresponding to the public service identifier of the merchant user, so as to view or learn of related information about the merchant user. After the social platform server establishes a member relationship between the social application identifier and the public service identifier, the consumer user may further perform interaction of queries for a consumption record and a member level in the Web page.

Step 304: Receive an account establishment instruction sent by a terminal corresponding to the social application identifier.

The account establishment instruction is an instruction that is sent by the terminal corresponding to the social application identifier when the terminal displays the Web page and detects an account establishment operation performed in the Web page.

For example, after the social platform server establishes the member relationship between the social application identifier of the consumer user and the public service identifier of the merchant user, the consumer user may access the Web page corresponding to the public service identifier of the merchant user by using the application program that is installed in the second terminal and that corresponds to the social platform server; enters a stored value account management interface by using a stored value account management portal in the Web page; and clicks, in the stored value account management interface, a key for establishing a bonus point stored value account. In this case, the second terminal may send the account establishment instruction to the social platform server.

Step 305: Establish an account corresponding to the social application identifier and the public service identifier, an example of the account being a bonus point stored value account.

The bonus point stored value account may be a virtual bonus point account, or may be a cash stored value account.

In this embodiment of the present application, after establishing the member relationship between the social application identifier of the consumer user and the public service identifier of the merchant user, the social platform server may further establish the bonus point stored value account of the merchant user for the consumer user. A user may recharge in the bonus point stored value account. When subsequently consuming at the merchant user again, the consumer user may perform an online payment by using the bonus point stored value account, thereby improving the convenience of payment.

For example, when consuming at the merchant user, the consumer user may access the Web page corresponding to the public service identifier of the merchant user by using the application program installed in the second terminal, and enters a payment interface through a payment portal in the Web page. The payment interface includes a quick response code including related information about the social application identifier or the bonus point stored value account of the consumer user. The merchant user scans the quick response code by using the first terminal to complete payment.

Step 306: Return account information to the terminal corresponding to the social application identifier.

The account information is used for instructing the terminal corresponding to the social application identifier to display the account in the Web page or in a subpage of the Web page.

For example, after establishing the bonus point stored value account corresponding to the social application identifier and the public service identifier, the social platform server returns the related information about the bonus point stored value account to the second terminal. The second terminal displays, in the stored value account management interface of the application program, detailed information, such as balance, of the bonus point stored value account. The consumer user may further perform operations such as recharge or withdrawal on the bonus point stored value account by using the stored value account management interface.

Step 307: Query a second interaction record corresponding to the public service identifier and the social application identifier, the second interaction record being used for indicating an interaction performed, by using the account, by the second user with the first user.

When the consumer user becomes a member of the merchant user, and performs online consumption by using the bonus point stored value account, the social platform server collects statistics on each record of consumption performed, by using the stored value account, by the consumer user, saves the record of the consumption performed by using the consumption stored value account as the second interaction record, and stores the second interaction record in correspondence to the public service identifier of the merchant user and the social application identifier of the consumer user. Content included in the second interaction record is similar to content included in the first interaction record, and details are not described herein again.

Step 308: Adjust (or manage), according to the second interaction record, the association relationship between the social application identifier and the public service identifier.

In some embodiments, the association relationship between the social application identifier and the public service identifier may alternatively be adjusted (or managed) according to a preset management rule.

The social platform server may manage, according to the second interaction record, the member relationship between the social application identifier of the consumer user and the public service identifier of the merchant user. For example, the member relationship may further be divided into several levels. When a quantity of times of consumption recorded in the second interaction record is greater than a threshold of the quantity of times, or a total amount recorded in the second interaction record is greater than an amount threshold, the member relationship may be upgraded to a corresponding member level. Different member levels may have different permissions, and the like.

In a possible implementation, before determining whether the first interaction record meets the first preset condition, the social platform server may further receive a condition setting request sent by the terminal corresponding to the public service identifier. The condition setting request includes a setting parameter. The setting parameter is a parameter entered or selected by the first user in a condition setting interface displayed at the terminal corresponding to the public service identifier. The first preset condition is set according to the setting parameter.

The social platform server may synchronously support a plurality of different merchant users to register respective corresponding public service identifiers. Because demands of the merchant users are different, in this embodiment of the present application, the social platform server further supports the merchant user to autonomously set the first preset condition. Specifically, an application program installed in a terminal corresponding to the merchant user includes a condition setting interface. The condition setting interface includes several items that can be set. The merchant user performs an input setting or a selection setting on the items in the setting interface according to demands of the merchant user. After the setting is completed, the terminal sends related information about the setting of the merchant user as the setting parameter to the social platform server. The social platform server sets the first preset condition according to the related information about the setting of the merchant user.

In view of the above, according to the method for establishing an association relationship provided in this embodiment of the present application, the social platform server queries the first interaction record that corresponds to the public service identifier and the social application identifier, and that is used for indicating an interaction performed, by means of a manner other than the Web page corresponding to the public service identifier, by the second user with the first user, and establishes the association relationship between the social application identifier and the public service identifier when determining that the first interaction record meets the first preset condition. According to the foregoing method, the association relationship between the consumer user and the merchant user can be automatically established according to offline consumption records of the consumer user, the consumer user only needs to reserve an account during offline consumption, and the merchant user uploads the account and related consumption information to the social platform server, so that the social platform server can automatically establish the association relationship. Neither initiative promotion of the merchant user nor initiative registration of the consumer user is needed, simplifying operation processes of the merchant user and the consumer user, and saving time for the merchant user and the consumer user.

In addition, according to the method for establishing an association relationship provided in this embodiment of the present application, the social platform server generates, for the consumer user, an account (for example, a bonus point stored value account) corresponding to the merchant user, so as to facilitate the consumer user to consume by using the bonus point stored value account, thereby improving payment convenience of the consumer user. In addition, the social platform server further automatically manages the association relationship between the consumer user and the merchant user according to a consumption record of the bonus point stored value account, so as to provide convenient management services for the member relationship.

After the social platform server establishes the association relationship between the social application identifier of the second user and the public service identifier of the first user, the second user becomes a silent user of the first user probably because the second user is not familiar with a method for using the association relationship, affecting user viscosity of the public service identifier of the first user. In view of the above, based on the embodiment shown in FIG. 3, in the present disclosure, the second user may further be guided, by means of pushing guidance information to the terminal (the second terminal) corresponding to the social application identifier of the second user, to use the association relationship. Refer to the descriptions in the embodiment corresponding to FIG. 4 for details.

Figure 4:
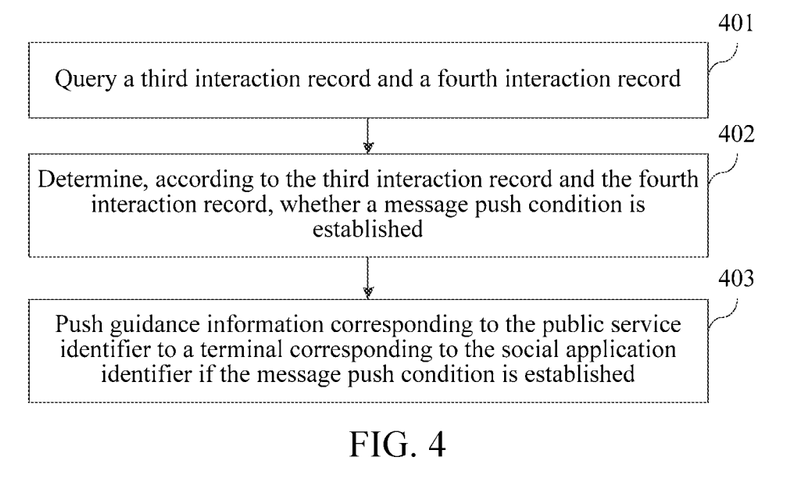
FIG. 4 is a flowchart of an information pushing method according to an exemplary embodiment.

FIG. 4 is a flowchart of an information pushing method according to an exemplary embodiment. The method may be performed by the social platform server 130 in the implementation environment shown in FIG. 1. As shown in FIG. 4, the information pushing method may include the following steps:

Step 401: Query a new first interaction record (that is, a third interaction record) and a new second interaction record (that is, a fourth interaction record).

For example, still assuming that an association relationship that is established between the social application identifier and the public service identifier and the association relationship is established in the social platform server as a member relationship between a consumer and a merchant, the first user is a merchant user corresponding to the first terminal, the second user is a consumer user corresponding to the second terminal, and the interaction record is a consumption record as an example, the consumer user is relatively highly interested in the merchant user, but is not familiar with a means of using the member relationship. Consequently, although the member relationship is rarely used, the consumer user may perform offline consumption at the merchant user relatively frequently. Therefore, in this embodiment of the present application, after establishing the member relationship between the social application identifier and the public service identifier, the social platform server obtains the new first interaction record and the new second interaction record at intervals, and determines, in combination with the new first interaction record and the new second interaction record, whether a consumer user corresponding to the social application identifier is a silent user of a merchant corresponding to the public service identifier.

Step 402: Determine, according to the new first interaction record (that is, the third interaction record) and the new second interaction record (that is, the fourth interaction record), whether the social application identifier meets a message push condition (that is, whether the message push condition is established).

The social platform server may determine whether the new first interaction record meets a second preset condition, and determine whether the new second interaction record meets a third preset condition. If a determining result is that the new first interaction record meets the second preset condition and the new second interaction record meets the third preset condition, the social platform server determines that the social application identifier meets the message push condition, that is, the message push condition is established. The second preset condition includes at least one of the following conditions: a bonus point interaction value is greater than a second value threshold, a quantity of times of interaction is greater than a second threshold of the quantity of times, an interaction type is a second specified type, or an interaction frequency in a preset time period is greater than a second frequency threshold. The third preset condition includes at least one of the following conditions: the bonus point interaction value is less than a third value threshold, the quantity of times of interaction is less than a third threshold of the quantity of times, the interaction type is a third specified type, or the interaction frequency in the preset time period is less than a third frequency threshold.

For example, when the social platform server determines, according to the new first interaction record after the member relationship between the social application identifier of the consumer user and the public service identifier of the merchant user is established, that a total amount of offline consumption of a specified type of the consumer user at the merchant user is greater than an amount threshold, a quantity of times of consumption is greater than a threshold of the quantity of times, and a consumption frequency in a latest time period is relatively high, and in addition, the social platform server determines, according to the new second interaction record, that a total amount of online consumption of a specified type performed by the consumer user at the merchant user by using a bonus point stored value account is less than an amount threshold, a quantity of times of consumption is less than a threshold of the quantity of times, and a consumption frequency in the latest time period is relatively low, the social platform server considers that the consumer user is not familiar with the means of using the member relationship.

Step 403: Push guidance information corresponding to the public service identifier to a terminal corresponding to the social application identifier if a determining result is that the social application identifier meets the message push condition, that is, the message push condition is established.

The guidance information may be preference information, or the like of the merchant user. When determining that the consumer user is not familiar with the means of using the member relationship, the social platform server may push the preference information of the merchant user to the terminal of the consumer user by using the social application identifier of the consumer user, so as to guide the consumer user to consume by using the established member relationship and the bonus point stored value account, thereby improving the use experience of the user for the member relationship.

In some embodiments, the social platform server sets the second preset condition and the third preset condition according to related information about setting of the merchant user.

In view of the above, according to the information pushing method provided in this embodiment of the present application, the social platform server obtains the new first interaction record and the new second interaction record, determines, according to the new first interaction record and the new second interaction record, whether the social application identifier meets the message push condition, pushes the guidance information corresponding to the public service identifier to the terminal corresponding to the social application identifier if the social application identifier meets the message push condition, and accurately determines whether the consumer user is familiar with an application of the established member relationship. When it is determined that consumer user is not familiar with the means of using the member relationship, the consumer user may be guided to consume by using the member relationship, thereby improving the use experience of the consumer user.

Figure 5:
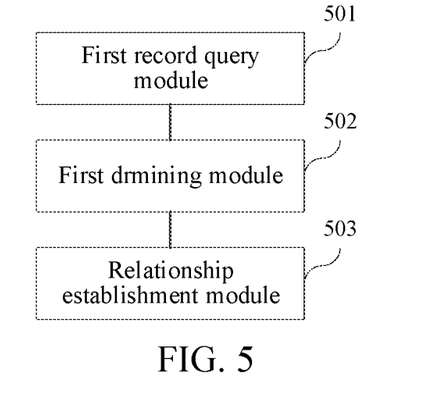
FIG. 5 is a block diagram of an apparatus for establishing an association relationship according to an exemplary embodiment.

Referring to FIG. 5, FIG. 5 shows a structural block diagram of an apparatus for establishing an association relationship according to an embodiment of the present application. The apparatus for establishing an association relationship may be implemented, by means of hardware or a combination of hardware and software, as the entire or a part of the social platform server 130 in the implementation environment shown in FIG. 1. The apparatus for establishing a member relationship may include:

a first record query module 501, configured to query a first interaction record corresponding to a public service identifier and a social application identifier, the first interaction record being used for indicating an interaction performed, by using the public service identifier and the social application identifier, by a first user and a second user;

a first detection module 502, configured to determine whether the first interaction record meets a first preset condition; and a relationship establishment module 503, configured to establish an association relationship between the social application identifier and the public service identifier if a determining result of the first detection module 502 is that the first interaction record meets the first preset condition.

The first interaction record may be stored in the social platform server, and the association relationship may be established in the social platform server.

The second user corresponds to the social application identifier, and the first user corresponds to the public service identifier.

The second user accesses an interface corresponding to the public service identifier by using the social application identifier, to interact with the first user. For example, the second user may interact with the first user by using a Web page corresponding to the public service identifier.

In some embodiments, the first interaction record is used for indicating an interaction performed, by using the Web page corresponding to the public service identifier, by the second user with the first user.

In view of the above, according to the apparatus for establishing a member relationship provided in this embodiment of the present application, by means of querying the first interaction record that corresponds to the public service identifier and the social application identifier, and that is used for indicating the interaction performed, by using the public service identifier and the social application identifier, by the first user and the second user, the association relationship between the social application identifier and the public service identifier is established when it is determined that the first interaction record meets the first preset condition. According to the foregoing method, the association relationship between a consumer user and a merchant user can be automatically established according to offline consumption records of the consumer user, the consumer user only needs to reserve an account during offline consumption, and the merchant user uploads the account and related consumption information to the social platform server, so that the social platform server can automatically establish the association relationship. Neither initiative promotion of the merchant user nor initiative registration of the consumer user is needed, simplifying operation processes of the merchant user and the consumer user, and saving time for the merchant user and the consumer user.

Figure 6:
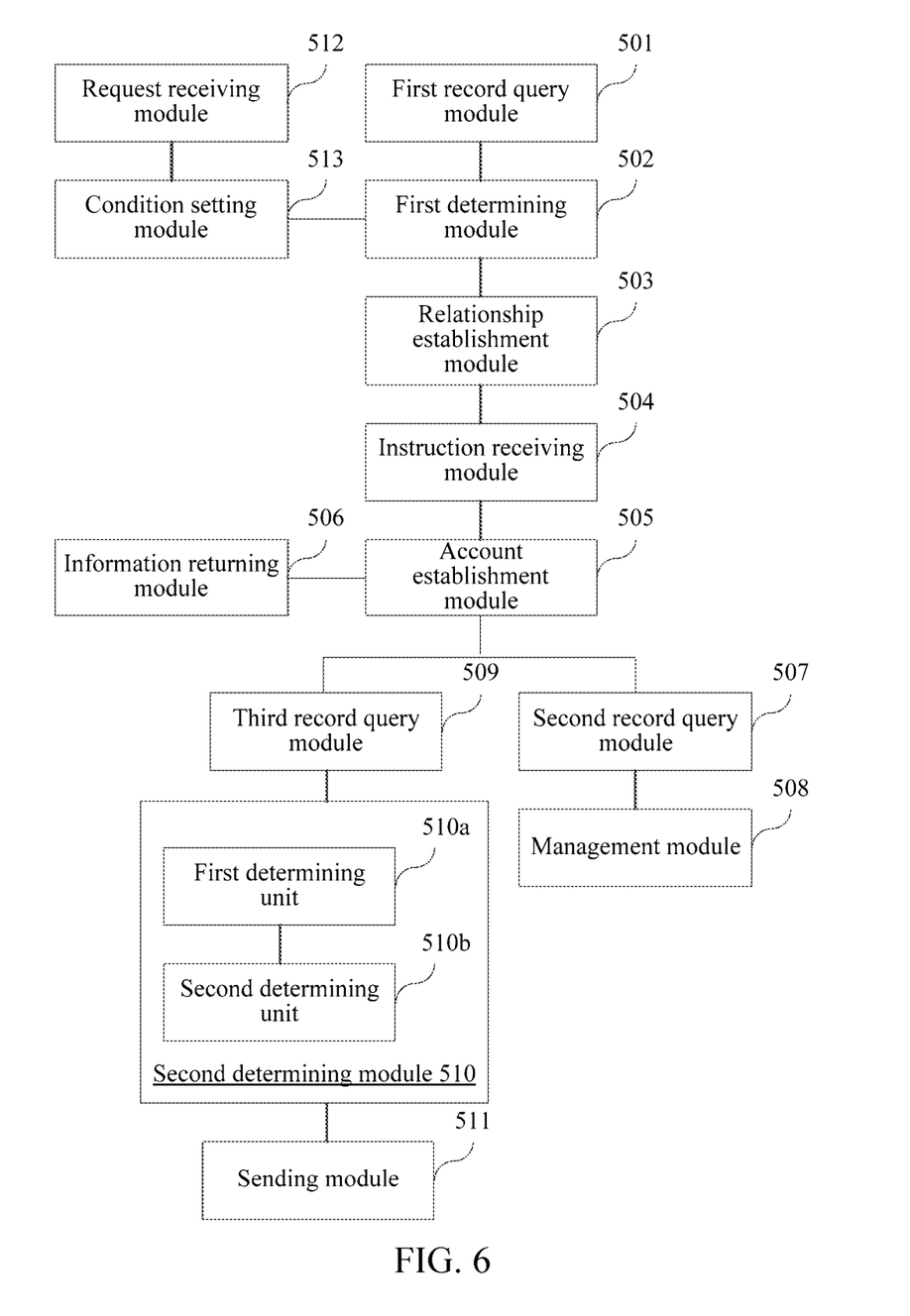
FIG. 6 is a block diagram of an apparatus for establishing an association relationship according to another exemplary embodiment.

Referring to FIG. 6, FIG. 6 shows a structural block diagram of an apparatus for establishing an association relationship according to another embodiment of the present application. The apparatus for establishing an association relationship may be implemented, by means of hardware or a combination of hardware and software, as the entire or a part of the social platform server 130 in the implementation environment shown in FIG. 1. The apparatus for establishing a member relationship may include a first record query module 501, a first detection module 502, and a relationship establishment module 503.

The first record query module 501 is configured to query a first interaction record corresponding to a public service identifier and a social application identifier. The first interaction record may be stored in the social platform server.

In some embodiments, the first interaction record is used for indicating an interaction performed, by using the public service identifier and the social application identifier, by a first user and a second user.

In some embodiments, the first interaction record is used for indicating an interaction performed, by using a Web page corresponding to the public service identifier, by the second user with the first user.

The first detection module 502 is configured to determine whether the first interaction record meets a first preset condition.

The relationship establishment module 503 is configured to establish an association relationship between the social application identifier and the public service identifier if a determining result of the first detection module 502 is that the first interaction record meets the first preset condition.

In some embodiments, the first interaction record includes at least one of a bonus point interaction value, a quantity of times of interaction, an interaction type, or interaction time.

The first preset condition includes at least one of the following conditions:

the bonus point interaction value is greater than a first value threshold, the quantity of times of interaction is greater than a first threshold of the quantity of times, the interaction type is a first specified type, or an interaction frequency in a preset time period is greater than a first frequency threshold.

In some embodiments, the apparatus further includes:

an instruction receiving module 504, configured to receive an account establishment instruction sent by a terminal corresponding to the social application identifier, where the account establishment instruction is an instruction that is sent by the terminal corresponding to the social application identifier when the terminal displays the Web page and detects an account establishment operation performed in the Web page;

an account establishment module 505, configured to establish an account corresponding to the social application identifier and the public service identifier, an example of the account being a bonus point stored value account; and an information returning module 506, configured to return account information to the terminal corresponding to the social application identifier.

The account information may be used for instructing the terminal corresponding to the social application identifier to display, in the Web page or in a subpage of the Web page, the bonus point stored value account.

In some embodiments, the apparatus further includes:

a second record query module 507, configured to query a second interaction record corresponding to the public service identifier and the social application identifier, the second interaction record being used for indicating an interaction performed, by using the account, by the second user with the first user; and a management module 508, configured to adjust (or manage), according to the second interaction record, the association relationship between the social application identifier and the public service identifier.

In some embodiments, the apparatus further includes:

a third record query module 509, configured to query a third interaction record and a fourth interaction record that correspond to the public service identifier and the social application identifier;

a second determining module 510, configured to determine, according to the third interaction record and the fourth interaction record, whether a message push condition is established; and a sending module 511, configured to push guidance information corresponding to the public service identifier to the terminal corresponding to the social application identifier if a determining result of the second determining module 510 is that the message push condition is established.

In some embodiments, the second determining module 510 includes:
- a first determining unit 510*a*, configured to: determine whether the third interaction record meets a second preset condition, and determine whether the fourth interaction record meets a third preset condition; and
- a second determining unit 510*b*, configured to determine that the message push condition is established if a determining result of the first determining unit 510*a* is that the third interaction record meets the second preset condition and the fourth interaction record meets the third preset condition.

The second preset condition includes at least one of the following conditions: the bonus point interaction value is greater than a second value threshold, the quantity of times of interaction is greater than a second threshold of the quantity of times, the interaction type is a second specified type, or the interaction frequency in the preset time period is greater than a second frequency threshold.

The third preset condition includes at least one of the following conditions: the bonus point interaction value is less than a third value threshold, the quantity of times of interaction is less than a third threshold of the quantity of times, the interaction type is a third specified type, or the interaction frequency in the preset time period is less than a third frequency threshold.

In some embodiments, the apparatus further includes:
- a request receiving module 512, configured to receive a condition setting request sent by a terminal corresponding to the public service identifier before the first detection module 502 determines whether the first interaction record meets the first preset condition, the condition setting request including a setting parameter, the setting parameter being a parameter entered or selected by the first user in a condition setting interface displayed at the terminal corresponding to the public service identifier; and
- a condition setting module 513, configured to set at least one of the first preset condition, the second preset condition, or the third preset condition according to the setting parameter.

In view of the above, according to the apparatus for establishing an association relationship provided in this embodiment of the present application, by means of querying the first interaction record that corresponds to the public service identifier and the social application identifier, and that is used for indicating the interaction performed, by using the public service identifier and the social application identifier, by the first user and the second user, the association relationship between the social application identifier and the public service identifier is established when it is determined that the first interaction record meets the first preset condition. According to the foregoing method, the association relationship between a consumer user and a merchant user can be automatically established according to offline consumption records of the consumer user, the consumer user only needs to reserve an account during offline consumption, and the merchant user uploads the account and related consumption information to the social platform server, so that the social platform server can automatically establish the association relationship. Neither initiative promotion of the merchant user nor initiative registration of the consumer user is needed, simplifying operation processes of the merchant user and the consumer user, and saving time for the merchant user and the consumer user.

In addition, according to the apparatus for establishing an association relationship provided in this embodiment of the present application, by means of generating, for the consumer user, an account (for example, a bonus point stored value account) corresponding to the merchant user, the consumer user is facilitated to consume by using the bonus point stored value account, thereby improving payment convenience of the consumer user. In addition, the association relationship between the consumer user and the merchant user is automatically managed according to a consumption record of the bonus point stored value account, so as to provide convenient management services for the member relationship.

In addition, according to the apparatus for establishing an association relationship provided in this embodiment of the present application, by means of obtaining a new first interaction record (that is, the third interaction record) and a new second interaction record (that is, the fourth interaction record), whether the social application identifier meets the message push condition is determined according to the new first interaction record and the new second interaction record. The guidance information corresponding to the public service identifier is pushed to the terminal corresponding to the social application identifier if the social application identifier meets the message push condition. Whether the consumer user is familiar with an application of the established member relationship is accurately determined. When it is determined that consumer user is not familiar with the means of using the member relationship, the consumer user may be guided to consume according to the member relationship, so as to improve the use experience of the consumer user.

Figure 7:
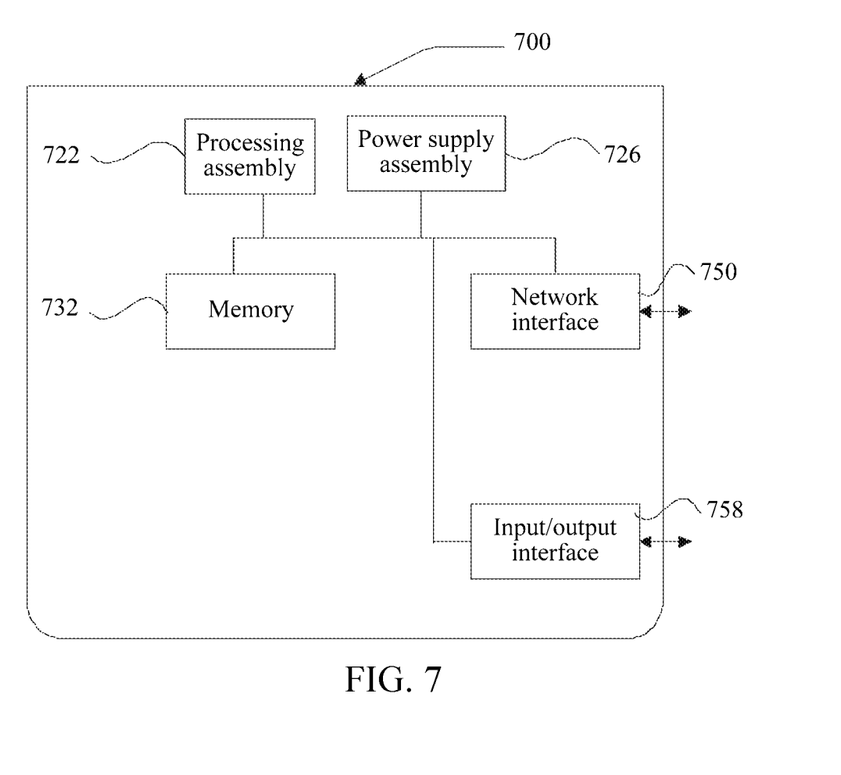
FIG. 7 is a schematic structural diagram of a device according to an exemplary embodiment.

FIG. 7 is a schematic structural diagram of another apparatus 700 according to an exemplary embodiment. For example, the apparatus 700 may be the social platform server 130 in the implementation environment shown in FIG. 1. Referring to FIG. 7, the apparatus 700 includes a processing assembly 722, the processing assembly 722 further including one or more processors, and a memory resource represented by a memory 732, the memory resource being used for storing instructions, for example, an application program, that can be executed by the processing assembly 722. The application program stored in the memory 732 may include one or more modules each of which corresponding to a set of instructions. In addition, the processing assembly 722 is configured to execute instructions, so as to perform the method shown in any one of FIG. 2 to FIG. 4 and performed by the social platform server. In general, the memory 732 corresponds to a non-transitory computer readable storage medium including volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices.

The apparatus 700 may further include a power supply assembly 726, configured to perform power supply management of the apparatus 700, a wired or wireless network interface 750, configured to connect the apparatus 700 to a network, and an input/output (I/O) interface 758. The apparatus 700 may operate an operating system stored in the memory 732, for example, Windows Server™, Mac OS X™, Unix™, Linux™, or Free BSD™.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the art. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method, implemented at an apparatus having one or more processors and memory storing instructions to be executed by the one or more processors, comprising:
    hosting a social networking platform, the social networking platform having a plurality of individual accounts and a plurality of public service accounts and enabling each public service account to provide service to respective individual accounts;
    receiving, from a public service account, a first preset condition for associating the public service account with one or more individual accounts based on interaction records of offline transactions between the public service account and the one or more individual accounts, the first preset condition setting forth at least one of: a first value threshold associated with a bonus point interaction value, a first threshold associated with a quantity of times of interaction, a first specified type associated with an interaction type, and a first frequency threshold associated with an interaction frequency in a preset time period;
    selecting a first interaction record corresponding to a first offline interaction performed between the public service account and a particular individual account;
    automatically and without user intervention:
        determining whether the first interaction record meets the first preset condition;
        in accordance with a determination that the first interaction record meets the first preset condition, establishing a membership of the individual account with the public service account; and
        generating a second interaction record based on one or more subsequent offline interactions between the individual account and the public service account after the establishment of the membership of the individual account with the public service account.

2. The method of claim 1, wherein the first preset condition comprises at least one of the following conditions:
    the bonus point interaction value is greater than the first value threshold, the quantity of times of interaction is greater than the first threshold of the quantity of times, the interaction type is the first specified type, or the interaction frequency in the preset time period is greater than the first frequency threshold.

3. The method according to claim 1, further comprising enabling an interface for the public service account, allowing a first user of the public service account to interact with a second user of the particular user account.

4. The method according to claim 3, wherein the first preset condition is received from a terminal that is associated with the public service account and displays the interface, the method further comprising:
    returning membership information to the terminal associated with the public service account.

5. The method according to claim 4, further comprising:
    querying the second interaction record corresponding to the public service account and the particular individual account, the second interaction record indicating the one or more subsequent offline interactions performed, by using the public service and particular individual accounts, by the second user with the first user; and
    adjusting, according to the second interaction record, the membership of the individual account with the public service account.

6. The method according to claim 1, further comprising:
    querying a third interaction record and a fourth interaction record that correspond to the public service account and particular individual account;
    determining, according to the third interaction record and the fourth interaction record, whether a message push condition is established; and
    pushing guidance information corresponding to the public service account to a terminal corresponding to the particular individual account if the message push condition is established.

7. The method according to claim 6, wherein the determining, according to the third interaction record and the fourth interaction record, whether a message push condition is established comprises:
    determining whether the third interaction record meets a second preset condition, and determining whether the fourth interaction record meets a third preset condition; and
    determining that the message push condition is established if the third interaction record meets the second preset condition and the fourth interaction record meets the third preset condition, wherein
    the second preset condition comprises at least one of the following conditions: the bonus point interaction value is greater than a second value threshold, the quantity of times of interaction is greater than a second threshold of the quantity of times, the interaction type is a second specified type, or the interaction frequency in a preset time period is greater than a second frequency threshold; and
    the third preset condition comprises at least one of the following conditions: the bonus point interaction value is less than a third value threshold, the quantity of times of interaction is less than a third threshold of the quantity of times, the interaction type is a third specified type, or the interaction frequency in the preset time period is less than a third frequency threshold.

8. The method according to claim 6, wherein before the determining whether the first interaction record meets a first preset condition, the method further comprises:
    receiving a condition setting request sent by a terminal corresponding to the public service account, the condition setting request comprising a setting parameter; and
    setting at least one of the first preset condition, the second preset condition, or the third preset condition according to the setting parameter.

9. An apparatus comprising:
one or more processors;
memory; and
a plurality of instructions stored in the memory that, when executed by the one or more processors, cause the apparatus to perform a plurality of operations including:
  hosting a social networking platform, the social networking platform having a plurality of individual accounts and a plurality of public service accounts and enabling each public service account to provide service to respective individual accounts;
  receiving, from a public service account, a first preset condition for associating the public service account with one or more individual accounts based on interaction records of offline transactions between the public service account and the one or more individual accounts, the first preset condition setting forth at least one of: a first value threshold associated with a bonus point interaction value, a first threshold associated with a quantity of times of interaction, a first specified type associated with an interaction type, and a first frequency threshold associated with an interaction frequency in a preset time period;
  selecting a first interaction record corresponding to a first offline interaction performed between the public service account and a particular individual account;
  automatically and without user intervention:
    determining whether the first interaction record meets the first preset condition;
    in accordance with a determination that the first interaction record meets the first preset condition, establishing a membership of the individual account with the public service account; and
    generating a second interaction record based on one or more subsequent offline interactions between the individual account and the public service account after the establishment of the membership of the individual account with the public service account.

10. The apparatus according to claim 9, wherein the first preset condition comprises at least one of the following conditions:
  the bonus point interaction value is greater than the first value threshold, the quantity of times of interaction is greater than the first threshold of the quantity of times, the interaction type is the first specified type, or the interaction frequency in the preset time period is greater than the first frequency threshold.

11. The apparatus according to claim 9, the operations further comprising enabling an interface for the public service account, allowing a first user of the public service account to interact with a second user of the particular user account.

12. The apparatus according to claim 10, wherein the first preset condition is received from a terminal that is associated with the public service account and displays the interface, and the operations further comprise:
  returning membership information to the terminal associated with the public service account.

13. The apparatus according to claim 12, wherein the operations further comprise:
  querying a second interaction record corresponding to the public service identifier and the social application identifier, the second interaction record being used for indicating an interaction performed, by using the account, by the second user with the first user; and
  adjusting, according to the second interaction record, the association relationship between the social application identifier and the public service identifier.

14. The apparatus according to claim 9, wherein the operations further comprise:
  querying a third interaction record and a fourth interaction record that correspond to the public service identifier and the social application identifier;
  determining, according to the third interaction record and the fourth interaction record, whether a message push condition is established; and
  pushing guidance information corresponding to the public service identifier to the terminal corresponding to the social application identifier if the message push condition is established.

15. The apparatus according to claim 14, wherein the operation of determining, according to the third interaction record and the fourth interaction record, whether a message push condition is established further comprises:
  determining whether the third interaction record meets a second preset condition, and determining whether the fourth interaction record meets a third preset condition; and
  determining that the message push condition is established if the third interaction record meets the second preset condition and the fourth interaction record meets the third preset condition, wherein
  the second preset condition comprises at least one of the following conditions: a bonus point interaction value is greater than a second value threshold, a quantity of times of interaction is greater than a second threshold of the quantity of times, an interaction type is a second specified type, or an interaction frequency in a preset time period is greater than a second frequency threshold; and
  the third preset condition comprises at least one of the following conditions: the bonus point interaction value is less than a third value threshold, the quantity of times of interaction is less than a third threshold of the quantity of times, the interaction type is a third specified type, or the interaction frequency in the preset time period is less than a third frequency threshold.

16. A non-transitory computer readable storage medium storing a plurality of instructions configured for execution by an apparatus having one or more processors, the plurality of instructions causing the apparatus to perform a plurality of operations including:
  hosting a social networking platform, the social networking platform having a plurality of individual accounts and a plurality of public service accounts and enabling each public service account to provide service to respective individual accounts;
  receiving, from a public service account, a first preset condition for associating the public service account with one or more individual accounts based on interaction records of offline transactions between the public service account and the one or more individual accounts, the first preset condition setting forth at least one of: a first value threshold associated with a bonus point interaction value, a first threshold associated with a quantity of times of interaction, a first specified type associated with an interaction type, and a first frequency threshold associated with an interaction frequency in a preset time period;
  selecting a first interaction record corresponding to a first offline interaction performed between the public service account and a particular individual account;

automatically and without user intervention:
  determining whether the first interaction record meets the first preset condition;
  in accordance with a determination that the first interaction record meets the first preset condition, establishing a membership of the individual account with the public service account; and
  generating a second interaction record based on one or more subsequent offline interactions between the individual account and the public service account after the establishment of the membership of the individual account with the public service account.

17. The non-transitory computer readable storage medium according to claim 16, wherein the first preset condition comprises at least one of the following conditions:
the bonus point interaction value is greater than the first value threshold, the quantity of times of interaction is greater than the first threshold of the quantity of times, the interaction type is the first specified type, or the interaction frequency in the preset time period is greater than the first frequency threshold.

18. The non-transitory computer readable storage medium according to claim 16, the operations further comprising enabling an interface for the public service account, allowing a first user of the public service account to interact with a second user of the particular user account.

19. The non-transitory computer readable storage medium according to claim 17, wherein the first preset condition is received from a terminal that is associated with the public service account and displays the interface, and the operations further comprise:
  returning membership information to the terminal associated with the public service account.

20. The non-transitory computer readable storage medium according to claim 16, wherein the operations further comprise:
  querying a third interaction record and a fourth interaction record that correspond to the public service identifier and the social application identifier;
  determining, according to the third interaction record and the fourth interaction record, whether a message push condition is established; and
  pushing guidance information corresponding to the public service identifier to the terminal corresponding to the social application identifier if the message push condition is established.

* * * * *